July 7, 1953  A. W. H. JAMIESON  2,644,315
SYSTEM FOR THE SUPPLY OF CONDITIONED AIR IN AIRCRAFT
Filed Dec. 8, 1950  2 Sheets-Sheet 1

Inventor
Archie W. H. Jamieson
By
Emery, Holcombe & Blair
Attorneys

Patented July 7, 1953

2,644,315

UNITED STATES PATENT OFFICE 2,644,315

SYSTEM FOR THE SUPPLY OF CONDITIONED AIR IN AIRCRAFT

Archie William Holmes Jamieson, Hanworth, England, assignor of one-half to Sir George Godfrey & Partners (Holdings) Limited, Hanworth, England, a company of Great Britain Application December 8, 1950, Serial No. 199,781
In Great Britain July 4, 1949

9 Claims. (Cl. 62—6)

This invention relates to systems for the supply of conditioned air, and is more particularly but not exclusively applicable to the supply of conditioned air in aircraft, for example to cabins, instrument cabinets, or other places where it may be required in such aircraft.

For convenience in the present specification and claims the terms "hot air," "warm air," "cooling air" and "cold air" are to be regarded as relative terms and not as referring to air within any specific temperature ranges.

According to the present invention apparatus for supplying conditioned air comprises a passage through which relatively warm air is delivered under pressure, a vortex tube comprising a cylindrical chamber into which the compressed air is delivered through a jet in such a manner that it rotates about the axis of the chamber, an annular diaphragm extending across the chamber on one side of the point at which the air jet enters the chamber and having a central outlet aperture, a cold air outlet passage leading from the said central aperture, a hot air outlet passage leading from the other end of the chamber and means for so restricting the free flow of hot air through the hot air outlet passage as to cause flow of cold air through the central aperture and cold air outlet passage, and means for connecting the cold air outlet and/or the hot air outlet to a space in which conditioned air is required.

In one convenient arrangement according to the invention as aplied to an aircraft the air delivery passage leads from an appropriate stage in the multi-stage air compressor of a gas turbine serving to propel the aircraft.

A proportion of air may be tapped from the air delivery passage or the hot air outlet of the vortex tube and means may be provided for delivering such warm air to the cabin or space in which it is required, in a proportion which can be controlled.

In another application of the invention cool, dry air is supplied to a cabin or space containing radar or other apparatus to be maintained cool and dry.

It is usually preferred to include a heat exchanger for cooling the compressed air and through which the compressed air passes before it enters the vortex tube, and conveniently the arrangement is such that the quantity of coolant supplied to the heat exchanger is dependent on the quantity and/or temperature of the hot air leaving the vortex tube.

Thus the hot air outlet of the vortex tube may be in the form of an ejector nozzle in the outlet duct for the coolant so as automatically to control the supply of coolant by means of the suction action of the jet of air from the nozzle.

It is preferred also to include a thermostat mounted in the space in which conditioned air is required, a valve in the nozzle of the vortex tube hot air outlet, and connections between the thermostat and the valve whereby the valve may be opened and closed automatically so as to regulate the amount of hot air leaving the tube and hence the flow of coolant and the amount of cold air supplied to the space from the vortex tube.

The valve in the nozzle may be controlled by a pneumatic bellows device communicating respectively with the source of compressed air and a source of lower pressure through orifices having predetermined cross-sectional relationship, one of which is controlled by a valve under the control of the thermostat.

The invention may be carried into practice in various ways but one specific embodiment of the invention as applied to an aircraft with a gas turbine engine as its main power plant will now be described by way of example with reference to the accompanying drawings, in which Figure 1 is a somewhat diagrammatic side elevation of the aircraft air-conditioning plant, the cabin and engine being represented on a much smaller scale than the apparatus for conditioning the air;

Figure 4 is a side elevation on a reduced scale of an air intake scoop for use with the apparatus.

Figure 1:
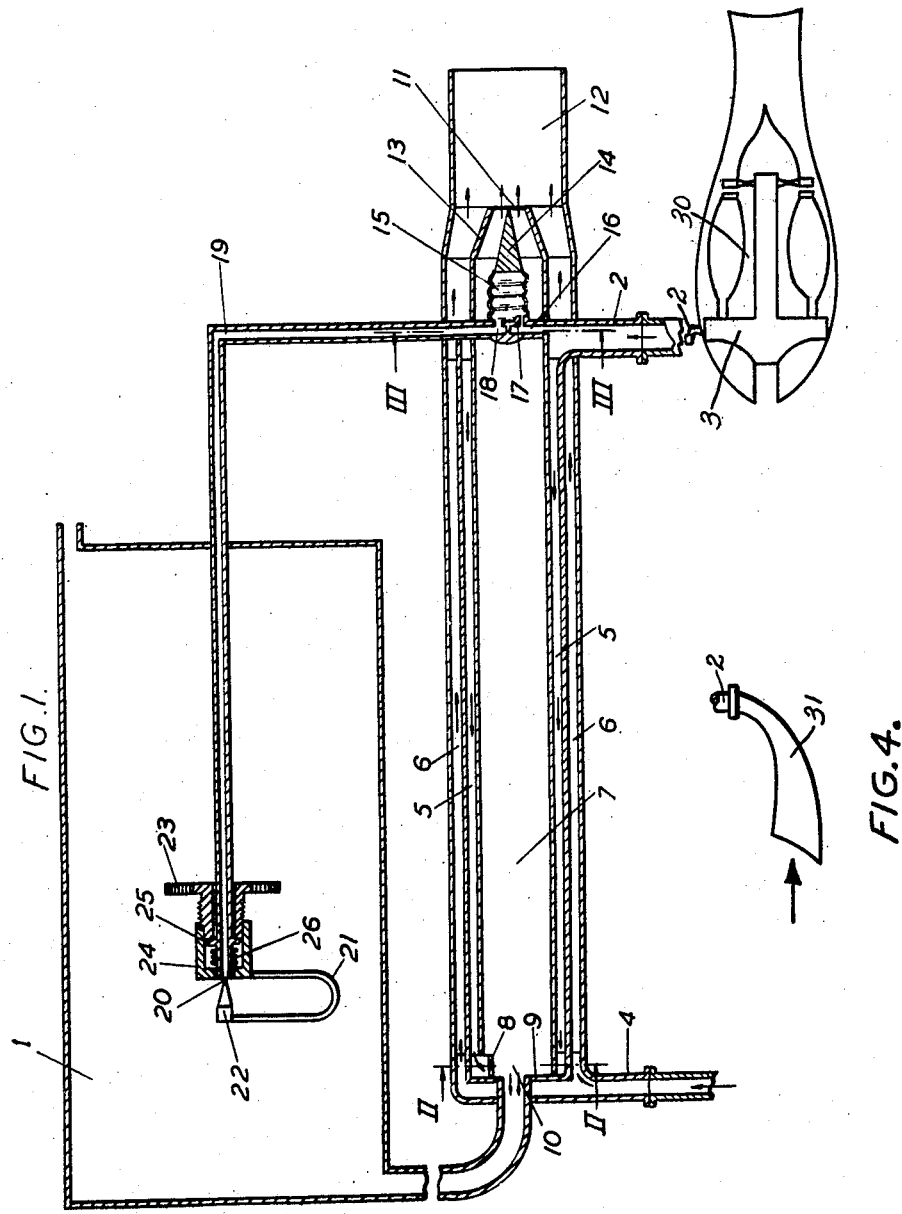
Figure 2:
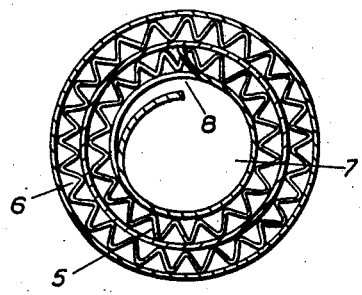
Figure 2 is a cross-sectional view on an enlarged scale on the line II—II of Figure 1.
Figure 3:
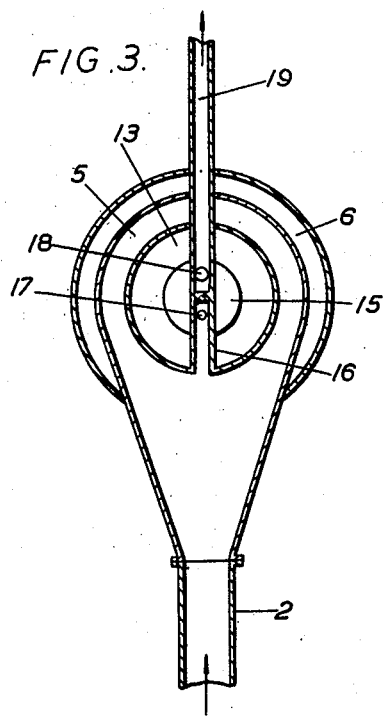
Figure 3 is a cross-sectional view on an enlarged scale on the line III—III of Figure 1.

In the arrangement shown the air-conditioning plant is designed to supply conditioned air to a space 1, which may be a cabin of the aircraft. Compressed air is supplied to a duct 2 from any convenient stage in the compressor unit 3 of the main gas turbine engine 30 of the aircraft, while cooling air admitted direct from the atmosphere is supplied to the duct 4. In an alternative construction shown in Figure 4, compressed air is supplied to the duct 2 from a forwardly facing air-intake scoop 31. The streams respectively of warm compressed air and of cooling air are led in counter-flow through the inner and outer passages 5 and 6 respectively of a heat exchanger surrounding a vortex tube 7 and the concentric inner and outer annular passages of the heat exchanger are provided with corrugated heat transfer plates to assist in the heat transference, as best seen in Figure 2.

The compressed air having passed through the heat exchanger and having been cooled somewhat in the process is then admitted in the form of a jet through a nozzle 8 at one end of the vortex tube 7. The nozzle 8 is so designed as to direct the jet of air tangentially around the inside surface of the tube thereby producing a vortex in the well known manner. The usual diaphragm 9 extends across the end of the tube adjacent to the nozzle 8 and is provided with a central aperture 10 through which cold air may therefore be withdrawn from the centre of the vortex and supplied to the aircraft cabin 1.

The other end of the tube 7 is provided with a restricted opening 11 through which hot air from the vortex is allowed to escape, the opening 11 being placed within a larger surrounding annular opening 12 through which the cooling air from the heat exchanger passes. The outlet pipe 13 for the hot air at this end of the vortex tube is in the form of an ejector nozzle so as to induce a draught in the cooling air annular passage 12, and by controlling the rate of flow of hot air through the opening 11 it is therefore possible to regulate the flow of cooling air through the opening 12. Thus an increase in the rate of escape of hot air results in an increase in the flow of cooling air so that there is a reduction in the temperature of the cold air passing through the aperture 10 due both to the increased cooling of the air jet entering the vortex tube and to the increased separation taking place in the vortex tube due to the increased flow of hot air therefrom.

The flow of hot air through the opening 11 is controlled by a valve which comprises a conical pin 14 lying within the nozzle 13 and arranged so that by moving towards and away from the opening it will vary the restriction caused by that opening. A pneumatic bellows 15 connected to the base of the conical pin 14 on the side of the pin remote from the opening 11 and itself fixed at its other end is employed to cause the required movement of the pin. Air is admitted to the bellows through a pipe 16 leading from the compressed air duct 2, the immediate entrance to the bellows being in the form of a calibrated aperture 17, while air leaves the bellows through a comparatively free exit aperture 18, an air pipe 19, and a control aperture 20. A U-shaped bimetal element 21 situated in the cabin 1 and connected to the air pipe 19 at one end and carrying a pin 22 at the other end arranged to restrict or close the control aperture 20 of the air pipe 19, acts as a thermostatic control valve, in dependence on the temperature prevailing in the cabin, thereby varying the pressure in the bellows 15, and causing the conical pin 14 to open or close the opening 11 so as to regulate the temperature of the air supplied to the cabin as explained above.

The thermostatic control may be adjusted by means of a manually operable screw 23 engaging with a sliding sleeve 24 to which one end of the bimetal element 21 is fixed, the screw being seated on a flange attached to the air pipe 19, so that rotation of the screw 23 will cause the bimetal element 21 and therefore the pin 22 to move bodily towards or away from the control aperture 20 as may be desired. A spring 26 lying between the flange 25 and the sliding sleeve 24 acts in opposition to the thrust of the screw.

While this particular application of the invention has been described without reference to the provision of hot air feeding arrangements to the cabin, it will be understood that connections may be led into the cabin direct from the hot air outlet 11 of the vortex tube is desired, and that this supply of hot air may be thermostatically controlled.

In other applications of this type of apparatus the cold air issuing from the vortex tube, which will normally be substantially below 0° C., may be used for cooling any desired compartment such as one containing special radar or other equipment, for making ice or providing refrigeration for other purposes, while the hot air may be at such high temperature that it can be used for boiling water or cooking purposes in aircraft where apparatus for such purposes is required. In this connection it may be mentioned that with a well designed vortex tube, and with warm compressed air supplied at a pressure of a few atmospheres it is possible to obtain a supply of cold air at temperatures as low as −50° C. and a supply of hot air at temperatures of 200° C. or more.

It is to be understood that, although the invention has been described with particular reference to arrangements in which the warm air supply is derived from an intermediate stage in the compressor of an internal combustion turbine constituting a propulsion unit in an aircraft, the warm air may be derived from other sources, for example from a separately driven air compressor, either coupled to the power unit of the aircraft or electrically driven or, in the case of comparatively high speed aircraft, merely from a forwardly facing air inlet passage.

It is also to be understood that the cold and/or the hot air thus obtained may be used in the aircraft for any purpose for which such cold and/or hot air is suitable.

What I claim and desire to secure by Letters Patent is:

1. Apparatus for supplying conditioned air, comprising a vortex tube in the form of a hollow body of revolution, a jet for supplying compressed air to the tube in such manner that it rotates about the axis of the tube, means for supplying compressed air to the jet, an annular diaphragm extending across the tube on one side of the point at which the air jet enters the tube and having a central outlet aperture for the outflow of cold air, a cold air outlet passage leading from the central outlet aperture and a hot air outlet passage leading from the other end of the tube, means for restricting the free flow of hot air through the hot air outlet passage and thereby causing a flow of cold air through the central aperture and cold air outlet passage, a heat exchanger for cooling the compressed air and through which the compressed air passes before it enters the vortex tube, means for supplying a coolant to the heat exchanger, an exhaust passage to carry away the coolant from the heat exchanger, an ejector nozzle connected to the hot air outlet passage from the vortex tube and arranged in said exhaust passage to permit control of the supply of coolant by means of the suction action of the nozzle, and means for connecting at least one of the hot and cold air outlet passages to a space in which conditioned air is required.

2. Apparatus as claimed in claim 1 including a thermostat mounted in the space in which conditioned air is required, a valve in the nozzle of the vortex tube hot air outlet, and an operative connection between said thermostat and said valve, whereby the valve is opened and closed automatically to regulate the amount of hot air leaving the tube and hence the flow of coolant and the flow of cold air to the space from the vortex tube.

3. Apparatus as claimed in claim 2 comprising a pneumatic bellows device to operate the valve, connecting pipes between the bellows device and the source of compressed air and a source of lower pressure respectively, and orifices in each connecting pipe having predetermined cross-sectional relationship, at least one orifice being controlled by the thermostat.

4. Apparatus for supplying conditioned air in an aircraft comprising a gas turbine serving to propel the aircraft and including an air compressor which delivers air to the turbine and also constitutes a source of compressed air, a vortex tube in the form of a cylindrical chamber, a jet for delivering compressed air to the chamber, an annular diaphragm extending across the chamber on one side of the point at which the air jet enters the chamber and having a central outlet aperture for the outflow of cold air, a hot air outlet passage leading from the other end of the chamber and a cold air outlet passage leading from the central outlet aperture, means for restricting the free flow of hot air through the hot air outlet passage and thereby causing a flow of cold air through the central aperture and cold air outlet passage, means for connecting at least one of the hot and cold air outlet passages to a space in the aircraft in which conditioned air is required, a heat exchanger for cooling the compressed air and through which compressed air passes before it enters the vortex tube, means for supplying coolant to the heat exchanger, an exhaust passage to carry away the coolant from the heat exchanger, and an ejector nozzle connected to the hot air outlet passage from the vortex tube and arranged in said exhaust passage to permit control of the supply of coolant by means of the suction action of the nozzle.

5. Apparatus as claimed in claim 4 including a thermostat mounted in the space in which conditioned air is required, a valve in the nozzle of the vortex tube hot air outlet, and an operative connection between said thermostat and said valve, whereby the valve is opened and closed automatically to regulate the amount of hot air leaving the tube and hence the flow of coolant and the flow of cold air to the space from the vortex tube.

6. Apparatus as claimed in claim 5 comprising a pneumatic bellows device to operate the valve, connecting pipes between the bellows device and the source of compressed air and a source of lower pressure respectively, and orifices in each connecting pipe having predetermined cross-sectional relationship, at least one orifice being controlled by the thermostat.

7. Apparatus for supplying conditioned air in an aircraft comprising an air intake which supplies compressed air by reason of the velocity of the aircraft through the atmosphere, a vortex tube in the form of a cylindrical chamber, a jet for delivering compressed air to the chamber, an annular diaphragm extending across the chamber on one side of the point at which the air jet enters the chamber and having a central outlet aperture for the outflow of cold air, a hot air outlet passage leading from the other end of the chamber and a cold air outlet passage leading from the central outlet aperture, means for restricting the free flow of hot air through the hot air outlet passage and thereby causing a flow of cold air through the central aperture and cold air outlet passage, means for connecting at least one of the hot and cold air outlet passages to a space in the aircraft in which conditioned air is required, a heat exchanger for cooling the compressed air and through which compressed air passes before it enters the vortex tube, means for supplying coolant to the heat exchanger, an exhaust passage to carry away the coolant from the heat exchanger, and an ejector nozzle connected to the hot air outlet passage from the vortex tube and arranged in said exhaust passage to permit control of the supply of coolant by means of the suction action of the nozzle.

8. Apparatus as claimed in claim 7 including a thermostat mounted in the space in which conditioned air is required, a valve in the nozzle of the vortex tube hot air outlet, and an operative connection between said thermostat and said valve, whereby the valve is opened and closed automatically to regulate the amount of hot air leaving the tube and hence the flow of coolant and the flow of cold air to the space from the vortex tube.

9. Apparatus as claimed in claim 8 comprising a pneumatic bellows device to operate the valve, connecting pipes between the bellows device and the source of compressed air and a source of lower pressure respectively, and orifices in each connecting pipe having predetermined cross-sectional relationship, at least one orifice being controlled by the thermostat.

ARCHIE WILLIAM HOLMES JAMIESON.

References Cited in the file of this patent

UNITED STATES PATENTS

| Number | Name | Date |
| --- | --- | --- |
| 1,952,281 | Ranque | Mar. 27, 1934 |
| 2,391,838 | Kleinhans | Dec. 25, 1945 |
| 2,503,250 | Exkert | Apr. 11, 1950 |
| 2,557,101 | Mayer | June 19, 1951 |